United States Patent
Niiya

(10) Patent No.: US 9,020,314 B2
(45) Date of Patent: Apr. 28, 2015

(54) OPTICAL FIBER UNIT

(75) Inventor: Masayuki Niiya, Isehara (JP)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 387 days.

(21) Appl. No.: 13/425,991

(22) Filed: Mar. 21, 2012

(65) Prior Publication Data

US 2012/0243840 A1 Sep. 27, 2012

(30) Foreign Application Priority Data

Mar. 23, 2011 (JP) ................................. 2011-064096

(51) Int. Cl.
 *G02B 6/44* (2006.01)
(52) U.S. Cl.
 CPC .............. *G02B 6/4459* (2013.01); *G02B 6/443* (2013.01); *G02B 6/4461* (2013.01)
(58) Field of Classification Search
 CPC ......... G02B 6/44; G02B 6/4403; G02B 6/443
 See application file for complete search history.

(56) References Cited

U.S. PATENT DOCUMENTS

| | | | | | |
|---|---|---|---|---|---|
| 3,879,518 | A | * | 4/1975 | Ney et al. | 264/171.16 |
| 4,805,595 | A | * | 2/1989 | Kanbara | 600/140 |
| 4,836,639 | A | | 6/1989 | Shamoto et al. | |
| 5,473,723 | A | * | 12/1995 | Stockman et al. | 385/134 |
| 5,509,097 | A | * | 4/1996 | Tondi-Resta et al. | 385/113 |
| 6,041,153 | A | * | 3/2000 | Yang | 385/109 |
| 6,377,738 | B1 | * | 4/2002 | Anderson et al. | 385/113 |
| 6,487,345 | B1 | * | 11/2002 | Dixon et al. | 385/100 |
| 6,546,176 | B2 | * | 4/2003 | Anderson et al. | 385/113 |
| 6,594,427 | B1 | * | 7/2003 | Dixon et al. | 385/109 |
| 6,922,517 | B2 | * | 7/2005 | Matsueda et al. | 385/136 |
| 8,805,144 | B1 | * | 8/2014 | McAlpine et al. | 385/113 |
| 2002/0126970 | A1 | * | 9/2002 | Anderson et al. | 385/113 |
| 2012/0243840 | A1 | * | 9/2012 | Niiya | 385/109 |

FOREIGN PATENT DOCUMENTS

JP 62-49310 A 3/1987
JP A-62209405 9/1987

* cited by examiner

*Primary Examiner* — Rhonda Peace
(74) *Attorney, Agent, or Firm* — Oliff PLC

(57) ABSTRACT

An optical fiber unit (1) includes a tube (2) having stretchability in the axial direction, an optical fiber (4) movably housed in the tube (2), and a linear body (3) formed of a material having less stretchability than the tube (2). Both ends of the linear body (3) are fixed to both end portions of the tube (2) in a state where the tube (2) has been previously shrunk in the axial direction.

1 Claim, 6 Drawing Sheets

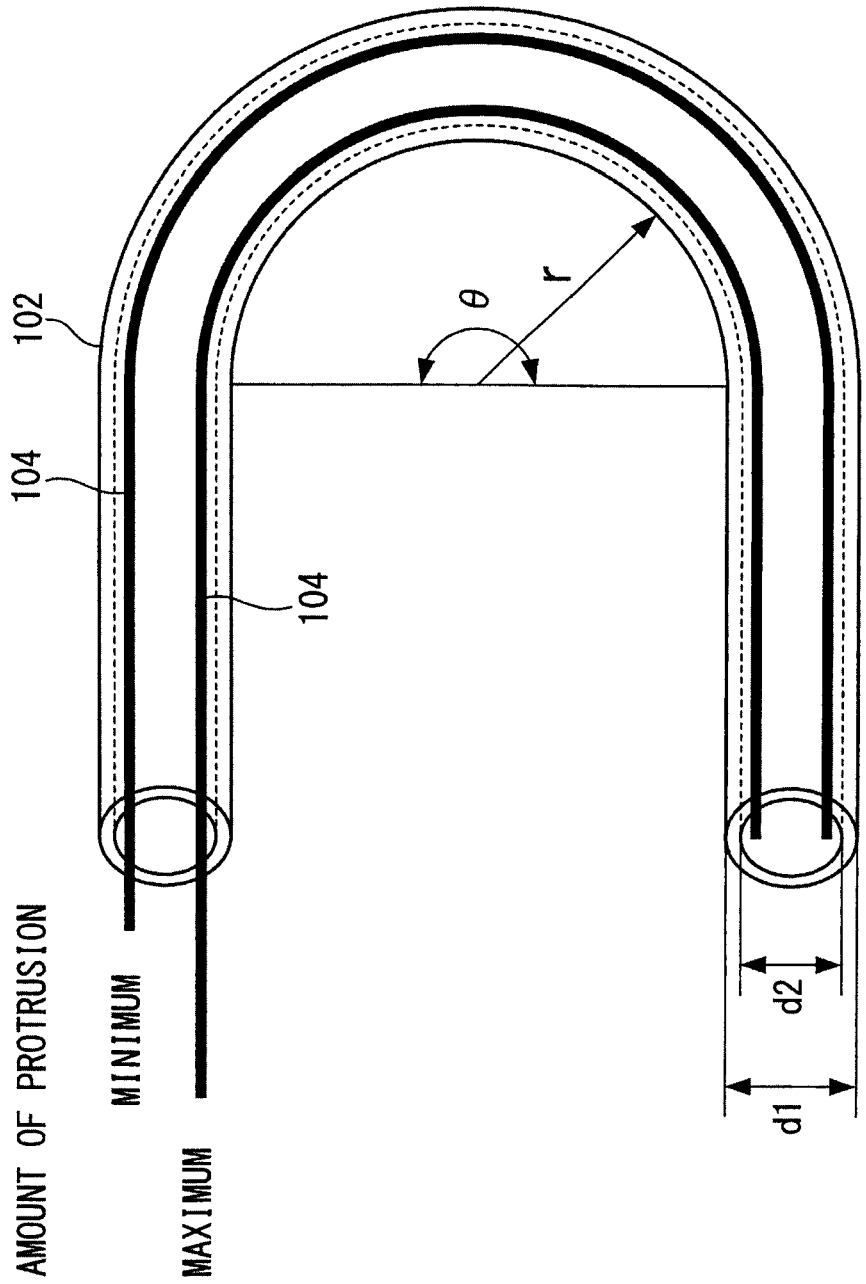

OPTICAL FIBER UNIT

CROSS REFERENCES TO RELATED APPLICATIONS

The present invention contains subject matter related to Japanese Patent Application JP 2011-064096 filed in the Japanese Patent Office on Mar. 23, 2011, the entire contents of which being incorporated herein by reference.

BACKGROUND OF THE INVENTION

1. Field of the Invention

The present invention relates to a tube having stretchability and possible to be bent, and an optical fiber unit configured by housing one or more optical fibers in the tube.

2. Description of the Related Art

There are two types of tubes for protecting optical fiber(s): one is a tube having an adhesion buffer layer in direct contact with the optical fiber(s), and the other is a tube adapted to movably house the optical fiber(s) therein. The tube adapted to movably house the optical fiber(s) therein has stretchability and is possible to be bent.

Japanese Unexamined Patent Application Publication No. S62-049310 describes an example of the tube having the optical fiber(s) movably housed therein. The tube described in Japanese Unexamined Patent Application Publication No. S62-049310 has two contiguous grooves each having a V-shaped cross-section. In such tube, two cuts are formed between the two grooves, and an opening can be formed by peeling off the portion surrounded by the two grooves and the two cuts.

SUMMARY OF THE INVENTION

However, when a tube having the optical fiber(s) movably housed therein (such as the tube described in Japanese Unexamined Patent Application Publication No. S62-049310) is bent, the tube will be deformed so that its entire length on the side of the inner diameter is shrunk. Thus, the portion of the optical fiber(s) housed in the tube will be protruded from one or both ends of the tube. Such case is not preferable because, if amount of the protrusion of the optical fiber(s) becomes larger, the portion of the optical fiber(s) unprotected by the tube will increase.

In view of the aforesaid problems, it is an object of the present invention to provide an optical fiber unit capable of preventing or reducing the protrusion of the optical fiber(s), even if the stretchable tube having the optical fiber(s) movably housed therein has been bent.

To solve the aforesaid problems and achieve the object of the present invention, an optical fiber unit according to an aspect of the present invention includes a tube having stretchability in the axial direction, an optical fiber movably housed in the tube, and a linear body formed of a material having less stretchability than the tube. Both ends of the linear body are fixed to both end portions of the tube in a state where the tube has been previously shrunk in the axial direction.

In the optical fiber unit having the aforesaid configuration, since the tube has been previously shrunk by the linear body, the tube is unlikely to be further shrunk even if it has been bent. Thus, it is possible to reduce the protrusion of the portion of the optical fiber housed in the tube from one or both ends of the tube.

With the optical fiber unit having the aforesaid configuration, it is possible to prevent or reduce the protrusion of the optical fiber even if the stretchable tube having the optical fiber movably housed therein is bent.

BRIEF DESCRIPTION OF THE DRAWINGS

FIG. 3 is a view for explaining amount of protrusion of the optical fiber;

DETAILED DESCRIPTION OF THE PREFERRED EMBODIMENTS

Figure 1:
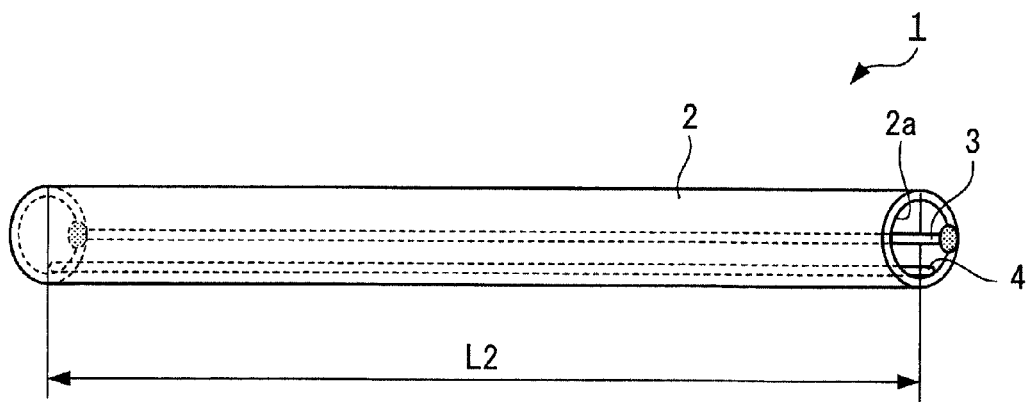
FIG. 1 is a schematic view showing an optical fiber unit according to a first embodiment of the present invention.

Preferred embodiments of the optical fiber unit of the present invention will be described below with reference to FIGS. 1 to 11. Note that, in the drawings, like components are denoted by like reference numerals.

First Embodiment of Optical Fiber Unit

Figure 2:
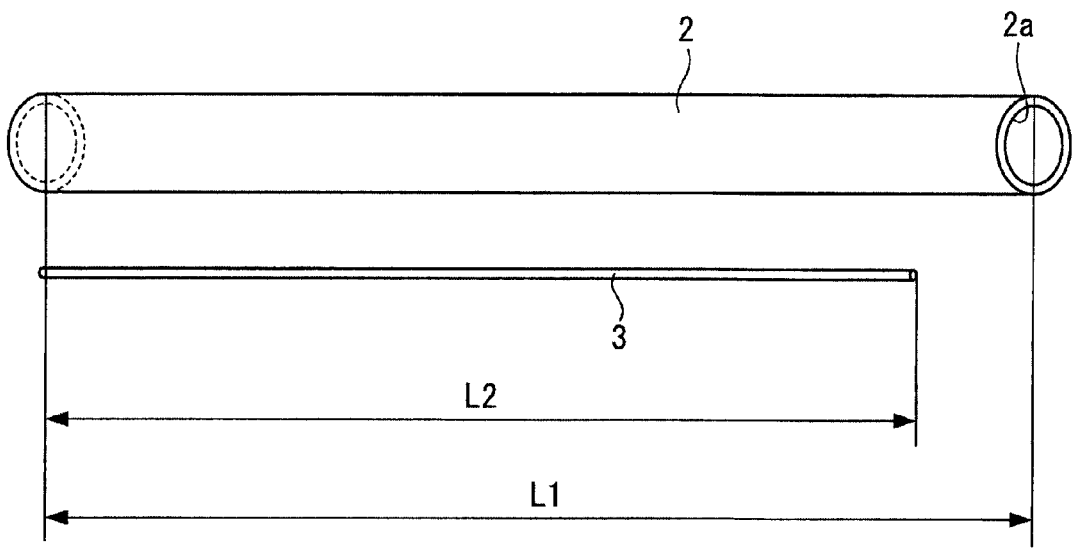
FIG. 2 is a view showing a tube and a linear body of the optical fiber unit according to the first embodiment.

First, an optical fiber unit according to a first embodiment will be described below with reference to FIG. 1 and FIG. 2. FIG. 1 is a schematic view of the optical fiber unit according to the first embodiment of the present invention. FIG. 2 is a view showing a tube and a linear body of the optical fiber unit according to the first embodiment.

As shown in FIG. 1, an optical fiber unit 1 includes a tube 2 stretchable in the axial direction, a linear body 3 fixed to the tube 2, and an optical fiber 4 movably housed in the tube 2.

The tube 2 is substantially formed in a circular tube shape, and has a tube-hole 2a. The tube 2 is configured by, for example, movably connecting a plurality of barrels in the axial direction, wherein the barrel is formed of a metal such as stainless steel, brass or the like.

Both ends of the linear body 3 are respectively fixed to both end portions of the tube 2. The linear body 3 may be fixed by method of: adhesive, adhesion tape, welding, caulking, fastening with a fastener member, achieving an indirect fixing by using a connection to a member fixed to each of the both end portion, or the like.

The linear body 3 is formed of a material having less (lower) stretchability than the tube 2. It is preferred that the linear body 3 is formed of a material that does not stretch under the tension generated when bending the tube 2. Further, the linear body 3 is configured so that it can be deformed in directions crossing the axial direction. For example, a wire, a string or the like can be used as the linear body 3

The optical fiber 4 passes through the tube-hole 2a of the tube 2. The both ends of the optical fiber 4 may also be provided with various types of connectors. Examples of the optical fiber whose both ends are provided with various types of connectors will be described later with reference to FIGS. 6 to 11.

As shown in FIG. 2, the entire length L1 of the tube 2 before the linear body 3 has been fixed is longer than the entire length L2 of the linear body 3. Thus, the both ends of the linear body 3 are fixed to the both end portions of the tube 2 in a state where the tube 2 is previously shrunk in the axial direction so that the entire length of the tube 2 becomes L2.

Further, the entire length L2 of the linear body 3 is substantially equal to the length of the portion of the optical fiber 4 housed in the tube 2. In other words, the entire length L2 of the linear body 3 is substantially equal to the length of the portion of the optical fiber 4 covered by the tube 2.

The entire length L1 of the tube 2 is determined according to allowable bending amount and the entire length L2 of the linear body 3. The allowable bending amount is defined as the upper limit of the angle at which the tube 2 is allowed to be bent when using the optical fiber unit 1. For example, when the allowable bending amount is 1080°, the tube 2 can be bent up to three turns.

When the tube 2 provided with no linear body 3 is bent, the tube 2 will be deformed so that the entire length of the inner side of the bent portion, which is deformed into a circular-arc shape, is shrunk. The shrinking amount changes according to the bending amount. Thus, the entire length L1 of the tube 2 is set to be equal to the sum of the entire length L2 of the linear body 3 and the shrinking amount of the inner side of the circular-arc shaped portion of the tube 2 caused by the allowable bending amount.

Next, the amount of the protrusion of the optical fiber caused when bending the tube provided with no linear body will be described below with reference to FIG. 3.

FIG. 3 is a view for explaining the amount of protrusion of the optical fiber.

As shown in FIG. 3, when a tube 102 provided with no linear body 3 is bent, the tube 102 will be deformed so that the inner side of the bent portion is shrunk. Thus, a difference in bending radius between the inner side and the outer side of the bent portion is caused, and such difference is equal to the outer diameter of the tube 102. As a result, an optical fiber 104 housed in the tube 102 will be protruded from one or both ends of the tube 102.

If the optical fiber 104 is located along the outer side of the bent portion of the tube 102, the amount of the protrusion of the optical fiber 104 will be the minimum. If the optical fiber 104 is located along the inner side of the bent portion of the tube 102, the amount of the protrusion of the optical fiber 104 will be the maximum.

Assuming that the outer diameter of the tube 102 is d1, the inner diameter is d2, the bending radius is r, and the bending amount is θ°, the amount of the minimum protrusion of the optical fiber 104 can be calculated according to the following formula.

[Formula 1]

$$2\pi \frac{\theta}{360}(r+d1) - 2\pi \frac{\theta}{360}\left(r + \frac{d1-d2}{2} + d2\right) = 2\pi \frac{\theta}{360}\left(\frac{d1-d2}{2}\right) \quad (1)$$

The amount of the maximum protrusion of the optical fiber 104 can be calculated according to the following formula.

[Formula 2]

$$2\pi \frac{\theta}{360}(r+d1) - 2\pi \frac{\theta}{360}\left(r + \frac{d1-d2}{2}\right) = 2\pi \frac{\theta}{360}\left(\frac{d1+d2}{2}\right) \quad (2)$$

Thus, when the tube 102 provided with no linear body is bent, the optical fiber 104 will be protruded from one or both ends of the tube 102. As a result, a portion of the optical fiber 104 will be left unprotected by the tube 102.

To solve such problem, it is considered to fix the optical fiber 104 to the both end portions of the tube 102 so as to prevent the protrusion of the optical fiber 104.

However, with such configuration, the optical fiber 104 can not be freely moved within the tube 102. Thus, when the optical fiber 104 within the tube 102 is damaged, it is necessary to remove the optical fiber 104 from the tube 102, and therefore the repair of the optical fiber 104 will be troublesome.

Description of State where Tube has been Bent

Next, a state where the tube 2 of the optical fiber unit 1 has been bent will be described below with reference to FIGS. 4A, 4B, 5A and 5B.

Figure 4A:
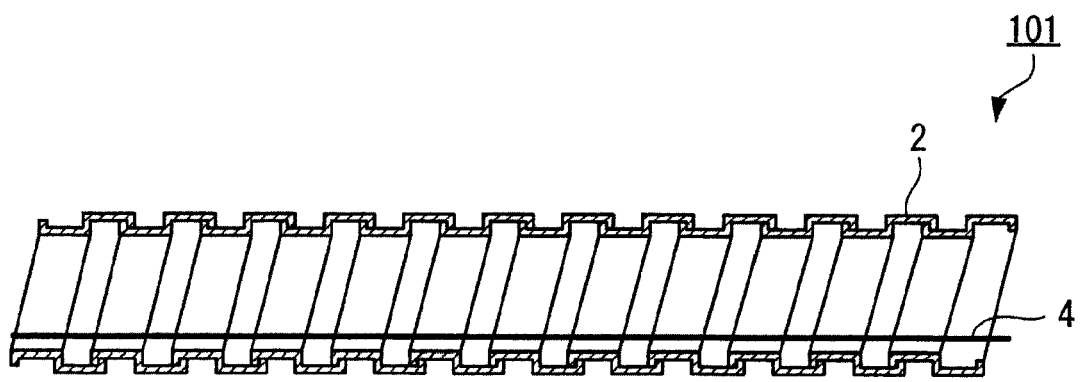
FIG. 4A is a vertical cross section of an optical fiber unit provided with no linear body.
Figure 4B:
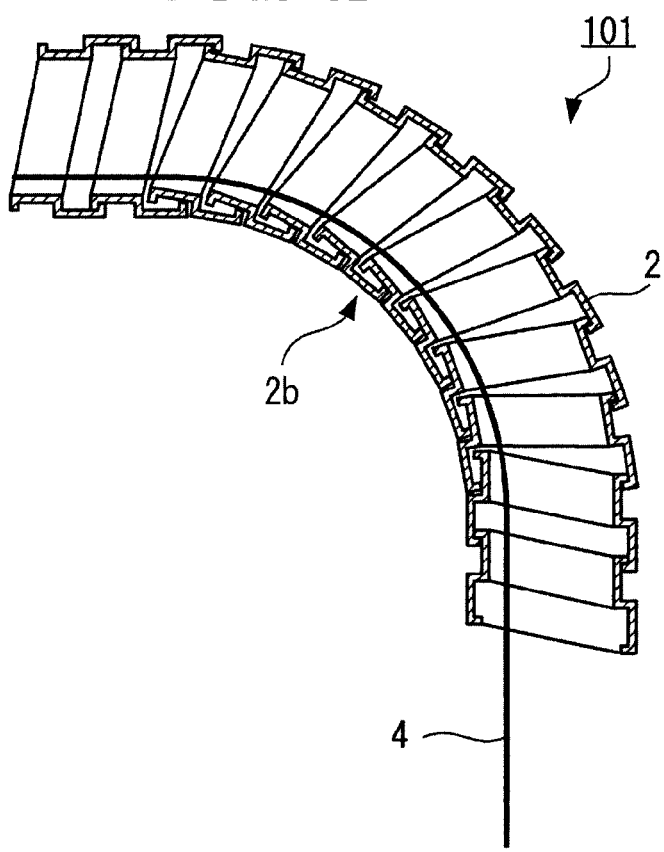
FIG. 4B is a vertical cross section of the optical fiber unit shown in FIG. 4A in a state where the optical fiber unit has been bent.
Figure 5A:
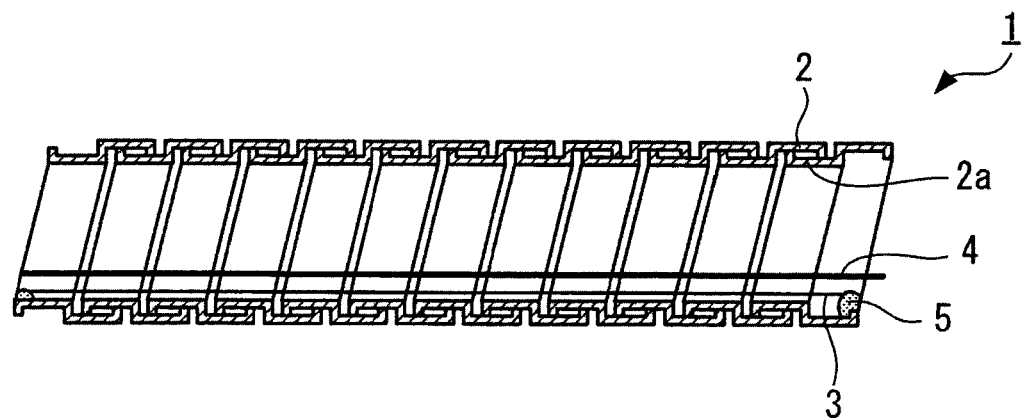
FIG. 5A is a vertical cross section of the optical fiber unit according to the first embodiment of the present invention.
Figure 5B:
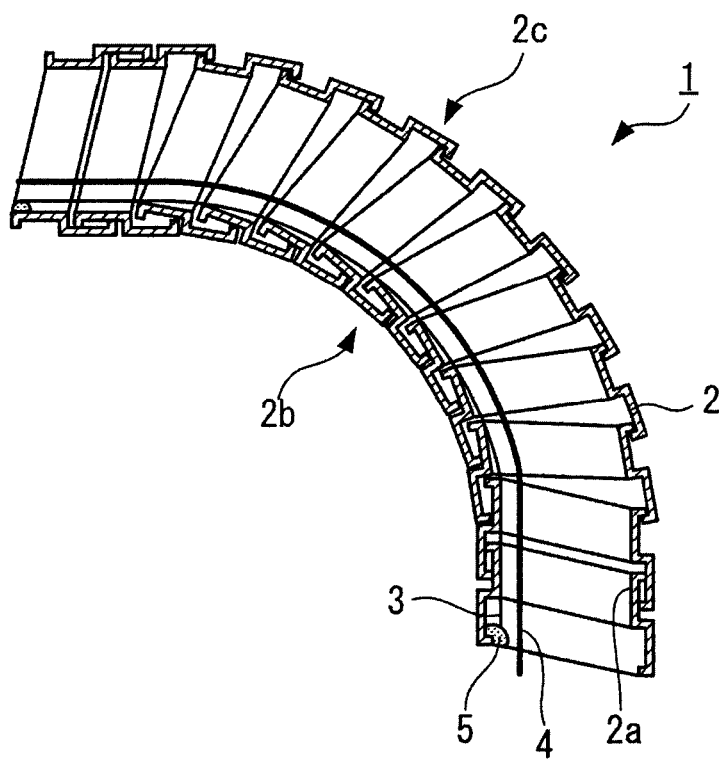
FIG. 5B is a vertical cross section of the optical fiber unit shown in FIG. 5A in a state where the optical fiber unit has been bent.

FIG. 4A is a vertical cross section of an optical fiber unit provided with no linear body 3 in a state where the optical fiber unit is straight. FIG. 4B is a vertical cross section of the optical fiber unit shown in FIG. 4A in a state where the optical fiber unit has been bent. FIG. 5A is a vertical cross section of the optical fiber unit 1 provided with the linear body 3 in a state where the optical fiber unit 1 is straight. FIG. 5B is a vertical cross section of the optical fiber unit 1 in a state where the optical fiber unit 1 has been bent.

An optical fiber unit 101 shown in FIGS. 4A and 4B is configured by removing the linear body 3 from the optical fiber unit 1, and includes the tube 2 and the optical fiber 4. The entire length of the optical fiber unit 101 is equal to the entire length L1 of the tube 2 (see FIG. 2). In other words, the tube 2 has not been previously shrunk.

As shown in FIG. 4B, when the optical fiber unit 101 is bent, the tube 2 will be deformed so that the inner side 2b of the bent portion of the tube 2 is shrunk. Thus, the optical fiber 4 is protruded from the tube 2.

In the optical fiber unit 1 of the present embodiment shown in FIGS. 5A and 5B, the both ends of the linear body 3 are fixed to the both end portions of the tube 2 by adhesive 5. Thus, the tube 2 is previously shrunk under the tension of the linear body 3, so that the entire length of the tube 2 becomes L2.

Incidentally, although the optical fiber 4 is located on the side of the linear body 3 within the tube-hole 2a of the tube 2 in FIGS. 5A and 5B, the optical fiber 4 is arranged so as to be freely movable within the tube-hole 2a.

As shown in FIG. 5A, the linear body 3 is fixed to one side of the tube 2 within the tube-hole 2a. Thus, the stretching of the one side of the tube 2 in the axial direction is restricted by the linear body 3. On the other hand, since no linear body 3 is fixed to the other side of the tube 2 within the tube-hole 2a, the other side of the tube 2 is stretchable. Further, the entire tube 2 is constantly subjected to a force that elongates the tube 2 along the axial direction.

As shown in FIG. 5B, when the optical fiber unit 1 is tried to be bent, the tube 2 is prone to be deformed so that the other side (the side to which the linear body 3 is not fixed) of the tube 2 is extended. In other words, the one side of the tube 2 becomes the inner side 2b without being shrunk, and the other side of the tube 2 is extended so as to become the outer side 2c. Thus, the tube 2 can be bent without being shrunk in the axial direction, so that it is possible to prevent or reduce the protrusion of the optical fiber 4 from one or both ends of the tube 2.

Incidentally, even if the optical fiber 4 is arranged along the other side (i.e., the outer side 2c of the bent portion) of the tube 2, since the tube 2 is deformed so that the other side thereof is extended, the optical fiber 4 will not be protruded from one or both ends of the tube 2.

For example, in the case where the linear body 3 is fixed to the tube 2 in a state where the tube 2 has been shrunk to an extent that it can not be further shrunk in the axial direction, only the other side of the tube 2 can be deformed in the extending direction. Thus, when bending the optical fiber unit 1 where the tube 2 has been shrunk to an extent that it can not be further shrunk in the axial direction, the other side of the tube 2 will necessarily be extended so as to become the outer side 2c of the bent portion, and the one side of the tube 2 will necessarily become the inner side 2b of the bent portion.

On the other hand, if the linear body 3 is fixed to the tube 2 in a state where the tube 2 has been shrunk to an extent that it can be further shrunk in the axial direction, there will also be a possibility that the other side (i.e., the side to which the linear body 3 is not fixed) of the tube 2 might be deformed in shrinking direction so as to become the inner side of the bent portion. However, in such a case, since the tube 2 has been previously shrunk, it is possible to reduce the shrinking amount of the other side of the tube 2. As a result, it is possible to reduce the amount of the protrusion of the optical fiber 4 from the one or both ends of the tube 2.

Further, since the linear body 3 has low stretchability, the deformation of the tube 2 in the extending direction can be restrained. Thus, the optical fiber unit 1 can be prevented being drawn back into the tube 2, so that work efficiency can be improved.

Further, in the optical fiber unit 1 of the present embodiment, it is possible to prevent or reduce the protrusion of the optical fiber 4 even if the optical fiber 4 is not fixed to the both end portions of the tube 2. Thus, when the optical fiber 4 within the tube 2 is damaged, the optical fiber 4 can be easily pulled out from the tube 2. As a result, the optical fiber 4 can be easily repaired.

Second Embodiment of Optical Fiber Unit

Next, an optical fiber unit according to a second embodiment will be described below with reference to FIG. 6.

Figure 6:
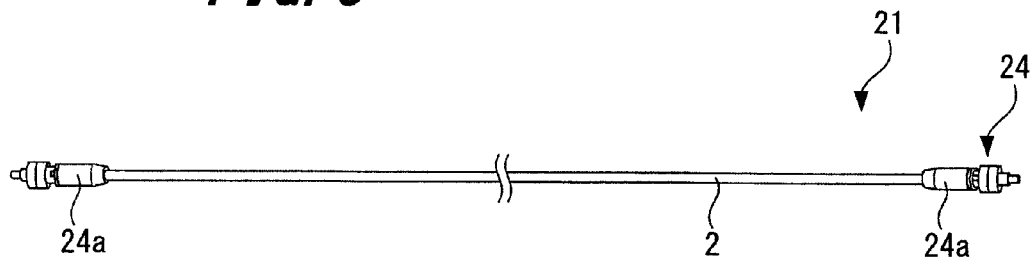
FIG. 6 is a perspective view showing an optical fiber unit according to a second embodiment of the present invention.

FIG. 6 is a perspective view showing an optical fiber unit 21 according to the second embodiment.

The optical fiber unit 21 shown in FIG. 6 has the same configuration as that of the optical fiber unit 1 of the first embodiment. In other words, in the optical fiber unit 21, both ends of a linear body (not shown) are fixed to the both end portions of the tube 2 in a state where the tube 2 has been previously shrunk in the axial direction.

The optical fiber unit 21 differs from the optical fiber unit 1 in that an optical fiber 24 of the optical fiber unit 21 is different from the optical fiber 4 of the optical fiber unit 1. Therefore, the description here is made focusing on the optical fiber 24, and the components identical to those of the optical fiber unit 1 are denoted by the same numerals and will not be described again.

The optical fiber 24 includes an optical fiber body (not shown) housed in the tube 2, and two optical connector plugs 24a, 24b respectively mounted on both ends of the optical fiber body.

Third Embodiment of Optical Fiber Unit

Next, an optical fiber unit according to a third embodiment will be described below with reference to FIG. 7.

Figure 7:
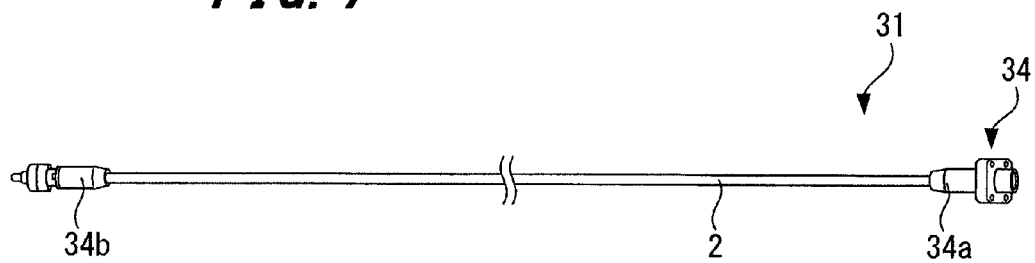
FIG. 7 is a perspective view showing an optical fiber unit according to a third embodiment of the present invention.

FIG. 7 is a perspective view showing an optical fiber unit 31 according to the third embodiment.

The optical fiber unit 31 shown in FIG. 7 has the same configuration as that of the optical fiber unit 1 of the first embodiment. In the optical fiber unit 31, both ends of a linear body (not shown) are fixed to the both end portions of the tube 2 in a state where the tube 2 has been previously shrunk in the axial direction.

The optical fiber unit 31 differs from the optical fiber unit 1 in that an optical fiber 34 of the optical fiber unit 31 is different from the optical fiber 4 of the optical fiber unit 1. The optical fiber 34 includes an optical fiber body (not shown) housed in the tube 2, an optical connector receptacle 34a mounted on one end of the optical fiber body, and an optical connector plug 34b mounted on the other end of the optical fiber body.

Fourth Embodiment of Optical Fiber Unit

Next, an optical fiber unit according to a fourth embodiment will be described below with reference to FIG. 8.

Figure 8:
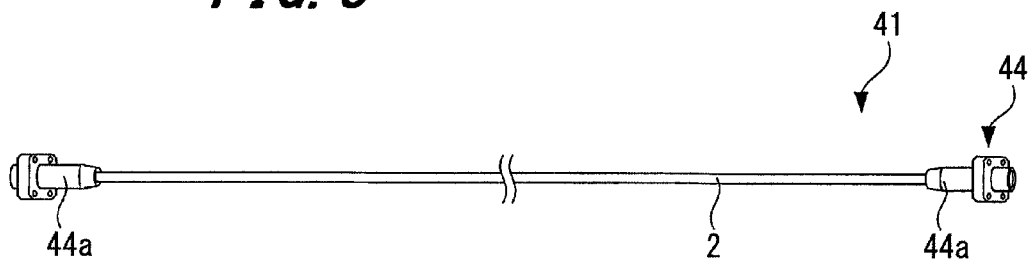
FIG. 8 is a perspective view showing an optical fiber unit according to a fourth embodiment of the present invention.

FIG. 8 is a perspective view showing an optical fiber unit 41 according to the fourth embodiment.

The optical fiber unit 41 shown in FIG. 8 has the same configuration as that of the optical fiber unit 1 of the first embodiment. In the optical fiber unit 41, both ends of a linear body (not shown) are fixed to the both end portions of the tube 2 in a state where the tube 2 has been previously shrunk in the axial direction.

The optical fiber unit 41 differs from the optical fiber unit 1 in that an optical fiber 44 of the optical fiber unit 31 is different from the optical fiber 4 of the optical fiber unit 1. The optical fiber 44 includes an optical fiber body (not shown) housed in the tube 2, and two optical connector receptacles 44a, 44b respectively mounted on both ends of the optical fiber body.

Fifth Embodiment of Optical Fiber Unit

Next, an optical fiber unit according to a fifth embodiment will be described below with reference to FIG. 9.

Figure 9:
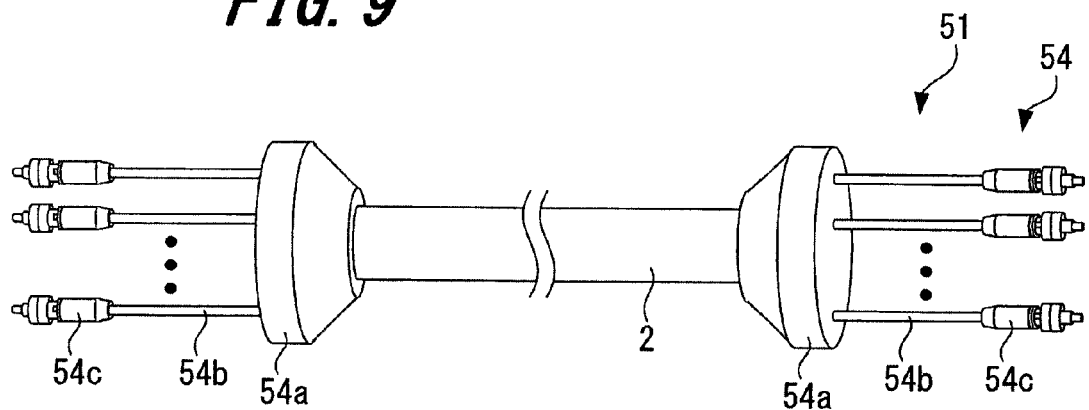
FIG. 9 is a perspective view showing an optical fiber unit according to a fifth embodiment of the present invention.

FIG. 9 is a perspective view showing an optical fiber unit 51 according to the fifth embodiment.

The optical fiber unit 51 shown in FIG. 9 has the same configuration as that of the optical fiber unit 1 of the first embodiment. In the optical fiber unit 51, both ends of a linear body (not shown) are fixed to the both end portions of the tube 2 in a state where the tube 2 has been previously shrunk in the axial direction.

The optical fiber unit 51 differs from the optical fiber unit 1 in that an optical fiber 54 of the optical fiber unit 51 is different from the optical fiber 4 of the optical fiber unit 1. The optical fiber 54 includes an optical fiber body (not shown) housed in the tube 2, two branching portions 54a, 54a, a plurality of optical fiber wiring portions 54b, and a plurality of optical connector plugs 54c.

The branching portion 54a, 54a are arranged on the both ends of the optical fiber body, and the plurality of optical fiber wiring portions 54b are connected to the branching portion 54a, 54a. Further, the plurality of optical connector plugs 54c are mounted on the tip ends of the plurality of optical fiber wiring portions 54b.

Sixth Embodiment of Optical Fiber Unit

Next, an optical fiber unit according to a sixth embodiment will be described below with reference to FIG. 10.

Figure 10:
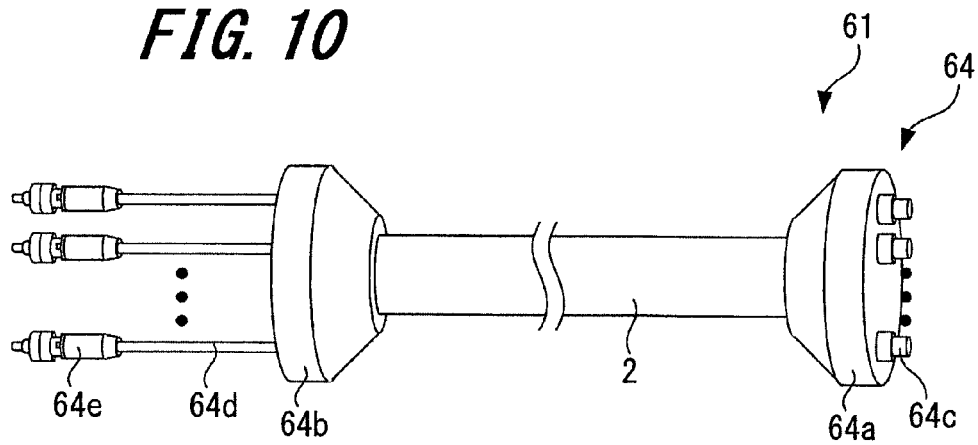
FIG. 10 is a perspective view showing an optical fiber unit according to a sixth embodiment of the present invention.

FIG. 10 is a perspective view showing an optical fiber unit 61 according to the sixth embodiment.

The optical fiber unit 61 shown in FIG. 10 has the same configuration as that of the optical fiber unit 1 of the first embodiment. In the optical fiber unit 61, both ends of a linear body (not shown) are fixed to the both end portions of the tube 2 in a state where the tube 2 has been previously shrunk in the axial direction.

The optical fiber unit 61 differs from the optical fiber unit 1 in that an optical fiber 64 of the optical fiber unit 61 is different from the optical fiber 4 of the optical fiber unit 1. The optical fiber 64 includes an optical fiber body (not shown) housed in the tube 2, two branching portions 64a, 64b, a plurality of optical connector receptacles 64c, a plurality of optical fiber wiring portions 64d, and a plurality of optical connector plugs 64e.

The branching portion 64a is arranged on one end of the optical fiber body, and the branching portion 64b is arranged on the other end of the optical fiber body.

The plurality of optical connector receptacles 64c are mounted on the branching portion 64a. On the other hand, the plurality of optical fiber wiring portions 64d are connected to the branching portion 64b. Further, the plurality of optical connector plugs 64e are mounted on the tip ends of the plurality of optical fiber wiring portions 64d.

Seventh Embodiment of Optical Fiber Unit

Next, an optical fiber unit according to a seventh embodiment will be described below with reference to FIG. 11.

Figure 11:
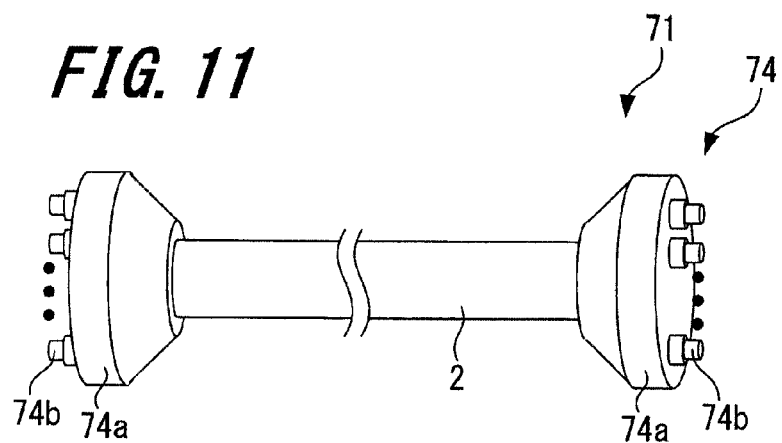
FIG. 11 is a perspective view showing an optical fiber unit according to a seventh embodiment of the present invention.

FIG. 11 is a perspective view showing an optical fiber unit 71 according to the seventh embodiment.

The optical fiber unit 71 shown in FIG. 11 has the same configuration as that of the optical fiber unit 1 of the first embodiment. In the optical fiber unit 71, both ends of a linear body (not shown) are fixed to the both end portions of the tube 2 in a state where the tube 2 has been previously shrunk in the axial direction.

The optical fiber unit 71 differs from the optical fiber unit 1 in that an optical fiber 74 of the optical fiber unit 71 is different from the optical fiber 4 of the optical fiber unit 1. The optical fiber 74 includes an optical fiber body (not shown) housed in the tube 2, two branching portions 74a, 74a arranged on the both ends of the optical fiber body, and a plurality of optical connector receptacles 74b mounted on the branching portions 74a, 74a.

The preferred embodiments of the optical fiber unit according to the present invention, as well as the advantages thereof, have been described above. However, the optical fiber unit of the present invention is not limited to the embodiments described above, and various modifications can be made without departing from the spirit and scope of the present invention.

For example, in the aforesaid embodiments, the tube 2 is configured by movably connecting a plurality of barrels in the axial direction, wherein the barrel is formed of a metal such as stainless steel, brass or the like; however, the tube of the present invention may also be configured by spirally winding a lineal metal, or by integral molding a material having stretchability.

Further, it is preferred that the linear body of the present invention has less (lower) stretchability than the tube, and has the same or less (lower) stretchability than the optical fiber.

Further, various types of optical fibers, such as single-mode fiber, multi-mode optical fiber, silica-based optical fiber, non-silica-based optical fiber, plastic optical fiber or the like, can be applied to the optical fiber of the present invention.

What is claimed is:

1. An optical fiber unit comprising:
   a tube that extends between two opposite end portions thereof along an axial direction, the tube having stretchability in the axial direction between a first entire length in a state where the tube has not been previously shrunk in the axial direction and a second entire length in a state where the tube has been previously shrunk in the axial direction;
   an optical fiber movably housed in the tube; and
   a linear body having two ends and being formed of a material having less stretchability than the tube, each end being fixed to a respective one of the two opposite end portions of the tube in the state where the tube has been previously shrunk in the axial direction to the second entire length, wherein an entire length of the linear body is substantially equal to the second entire length;
   wherein the first entire length is set to be substantially equal to a sum of the second entire length and a shrinking amount of an inner side of a circular-arc shaped portion of the tube when the tube is bent by an allowable bending amount defined as an upper limit of an angle at which the tube is allowed to be bent when using the optical fiber unit.

* * * * *